Oct. 7, 1958   J. D. OWEN   2,854,758
DOUBLE CALIPER FOR MUD CAKE THICKNESS DETERMINATION
Filed Dec. 23, 1954   4 Sheets-Sheet 1
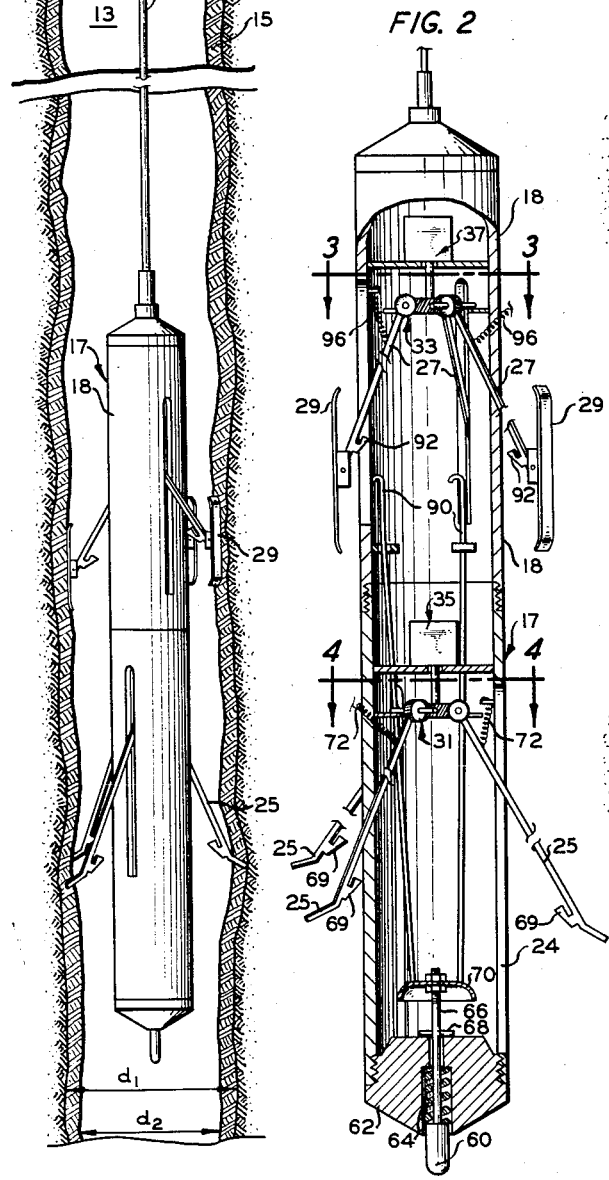
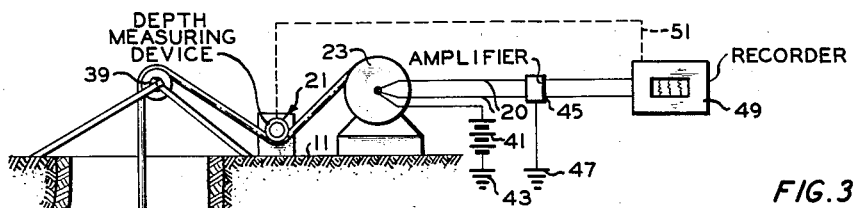
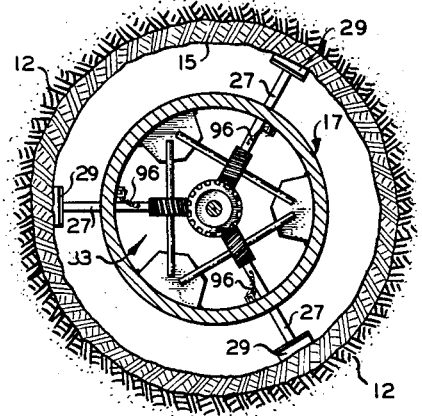
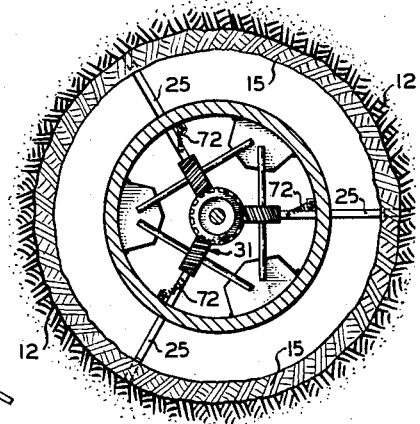
INVENTOR.
J. D. OWEN
BY Hudson & Young
ATTORNEYS Oct. 7, 1958 J. D. OWEN 2,854,758
DOUBLE CALIPER FOR MUD CAKE THICKNESS DETERMINATION
Filed Dec. 23, 1954 4 Sheets-Sheet 2
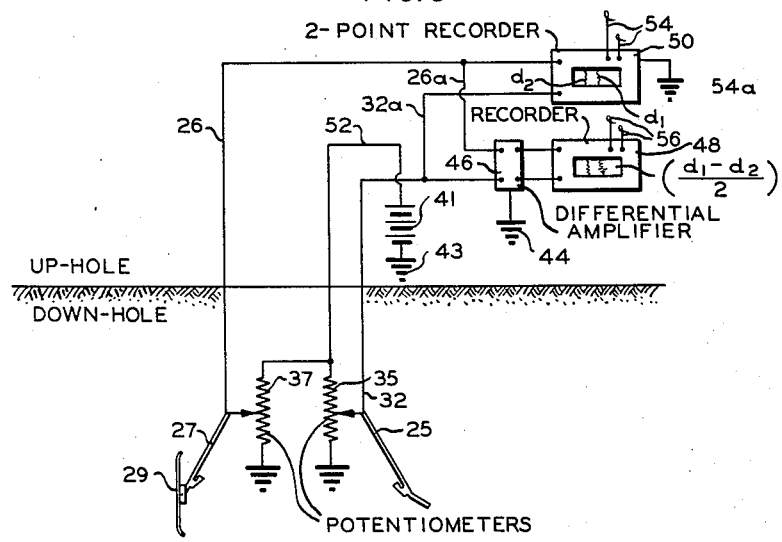
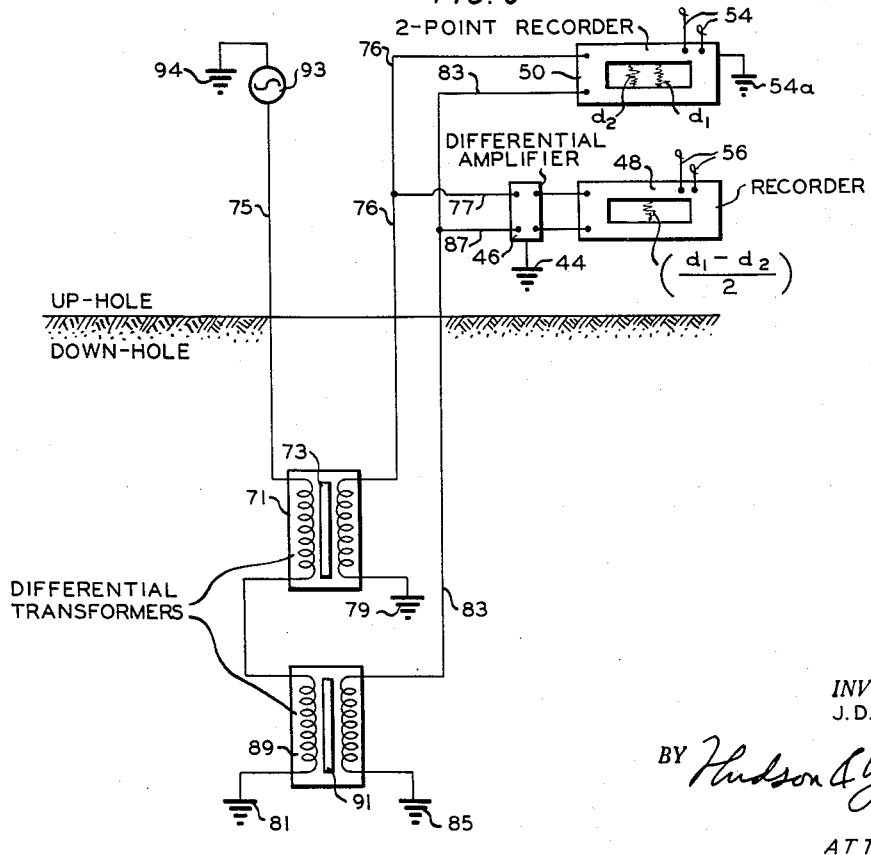
INVENTOR.
J. D. OWEN
BY Hudson & Young
ATTORNEYS Oct. 7, 1958 J. D. OWEN 2,854,758
DOUBLE CALIPER FOR MUD CAKE THICKNESS DETERMINATION
Filed Dec. 23, 1954 4 Sheets-Sheet 3

INVENTOR.
J. D. OWEN
BY Hudson & Young
ATTORNEYS

Oct. 7, 1958 J. D. OWEN 2,854,758
DOUBLE CALIPER FOR MUD CAKE THICKNESS DETERMINATION
Filed Dec. 23, 1954 4 Sheets-Sheet 4

INVENTOR.
J. D. OWEN
BY
ATTORNEYS

United States Patent Office 2,854,758
Patented Oct. 7, 1958

2,854,758

DOUBLE CALIPER FOR MUD CAKE THICKNESS DETERMINATION

Joe D. Owen, Bartlesville, Okla., assignor to Phillips Petroleum Company, a corporation of Delaware Application December 23, 1954, Serial No. 477,335

17 Claims. (Cl. 33—178)

This invention relates to well logging. In one aspect it relates to apparatus for determining mud cake thickness on the walls of deep wells. In another aspect it relates to apparatus for determining the mud cake thickness on walls of deep wells by use of a double caliper.

In the interpretation of micrologs mud cake thickness is taken into consideration. Corresponding charts are sometimes provided for use in the interpretation of logs. Such charts as far as I am aware have been prepared from laboratory measurements rather than from measurements made in the wells logged. Since the mud cake thickness in wells varies from level to level, a more nearly correct interpretation of the logs can be made when the exact mud cake thickness is known. Mud cake thickness according to my invention can be determined at the same time that the well is logged or it can be made before or after the conventional logging operation. In case the cake thickness is determined in the same operation and in conjunction with the logging operation the cake thickness alone can be determined or the inner diameter of the mud cake and its outer diameter can be determined and recorded on the logging chart. As an alternative and one which I prefer, the mud cake thickness is determined in a separate operation from the logging. In an operation of this type the depth of the well is recorded so that the thickness of the mud cake at various levels in the well can be correlated with the conventional log.

An object of my invention is to provide an apparatus for the determination of mud cake thickness in deep wells in which drilling muds are used in drilling the well.

Another object of my invention is to provide such an apparatus which is relatively simple to construct and to operate.

Still another object of my invention is to provide such an apparatus which is sturdy and rugged and provides the desired data accurately.

Still other objects and advantages of my invention will be realized upon reading the following description which taken with the attached drawing forms a part of this specification.

I accomplish these and other objects by providing an apparatus for measuring the thickness of a mud cake on the wall of a drill hole comprising in combination a body member adapted to be lowered into a drill hole, first caliper arms, one end of each first arm being supported by said body member, another portion of each arm being adapted to slide on the surface of said mud cake, second caliper arms, one end of each second arm being supported by said body member, another portion of each second arm being adapted to cut through said mud cake, and means to indicate the difference in positions of said other portions of said first arms relative to said other portions of said second arms. In the above apparatus said first caliper arms are linear arms having a hinged flat pad on the end of each arm opposite said body member, the flat pads being adapted to slide on the surface of said mud cake, said second caliper arms being linear arms having their ends opposite said body member suitably thinned and adapted to cut through said mud cake to the walls of said drill hole upon upward movement of said body member in said drill hole. This means for indicating the difference in positions of said arms is calibrated as desired, for example, it is in some cases calibrated to record half the difference between the outside diameter and the inside diameter of the mud cake, or it is in other cases calibrated to record or indicate the difference in the radii of the outside of the mud cake and the inside of the mud cake. In the first case, the difference in diameters is double the mud cake thickness while in the second case the difference is actually the thickness of the mud cake.

In the drawing, Figure 1 is an elevational view, partly in section, of the apparatus of my invention being operated in a deep well.

Figure 2 is an elevational view, partly in section, of one embodiment of my apparatus.

Figure 3 is a cross sectional view taken on the line 3—3 of Figure 2.

Figure 4 is a cross sectional view taken on the line 4—4 of Figure 2.

Figure 5 is a diagrammatical view of an electrical hookup for use with the apparatus of Figures 1 and 2.

Figure 6 is an electrical hookup for use with the embodiment of apparatus of Figure 8.

Figure 7:
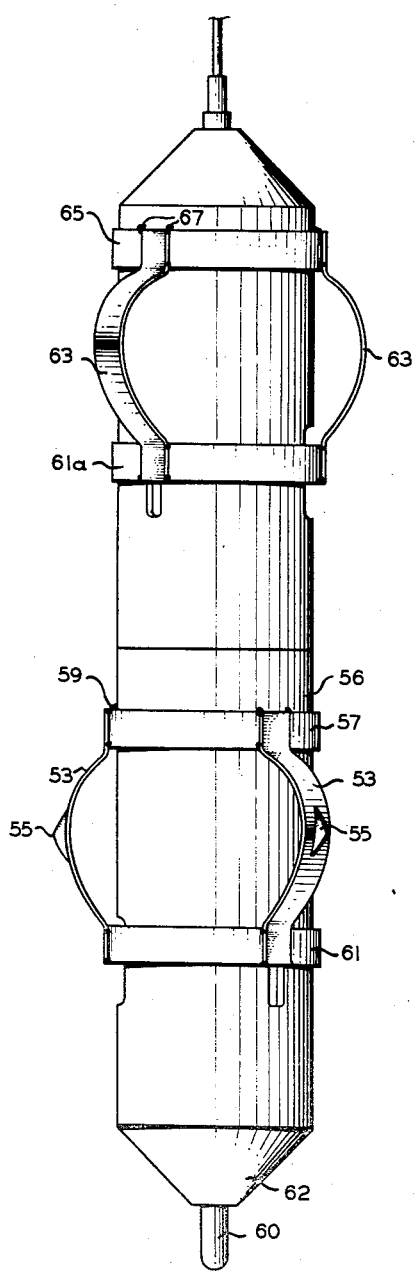
Figure 7 is an elevational view of another embodiment of my invention.

Referring now to the drawing and specifically to Figure 1 reference numeral 11 refers to the surface of the earth in which a deep well 13 herein termed a drill hole is constructed. The walls of the drill hole which represent various earth formations are identified by reference numeral 12. A mud cake 15 is deposited on the walls of the well during the drilling operation. A reel or cable drum 23 is provided for winding and unwinding lead wires and cable 19 for raising and lowering caliper assembly 17 in the bore hole. This caliper assembly 17 comprises a case or body member 18 in which are mounted various pieces of apparatus. In case 18 and disposed along the axis thereof is a potentiometer apparatus 35. On one end of this potentiometer is a helical gear assembly 31 so arranged that as one gear rotates in a horizontal plane the other gears operate in a vertical plane. The vertical gears have attached to them caliper arms 25. These arms are reasonably long and when the apparatus is in operation these arms extend from the helical gear assembly through openings 24 in the walls of the body member 18 and cut through the mud cake 15 on the walls of the well. Springs 72 are tension springs and are attached to the caliper arms 25 and the body member 18 to hold the arms 25 so that upon upward movement of the caliper assembly 17 arms 25 will cut through the mud cake and will rub against the various formations. This potentiometer 35 and caliper arm apparatus just rescribed is disposed in the lower portion of the body member 18 and in the upper portion thereof is disposed another potentiometer 37. This potentiometer is also provided with a helical gear assembly 33 to which are attached one end of caliper arms 27. To the other end of these caliper arms are attached slides or pads 29 as they may be called.

I prefer to term these pieces of apparatus slides since they actually slide upon the inner surface of the mud cake. Tension springs 96 are provided for holding the caliper arms 27 in such a position that the slides move on the inner surface of the mud cake as the apparatus is pulled upward in the drill hole.

I make provision for holding the caliper arms 25 and 27 in an inoperative position while the apparatus is being lowered down a drill hole. Into the lower end of the body 18 is threaded or otherwise attached a plug 62 into which a push button 60 extends. The top end of the push button is attached to a push rod 66 which has a smaller diameter than the diameter of the push button. Disposed around the lower portion of the push rod is a compression spring 64 which is intended to hold the push button downward until such time that the apparatus reaches the bottom of a well and the weight of the apparatus pushes the plug 62 downward and around the push button 60. On the upper end of the push rod 66 is disposed a bell shaped catch 70 which has its open end downward in such a manner as to encircle the ends of the hooks 69 on the caliper arms 25. A cotter key 68 is inserted through an opening in the push rod 66 in order to keep at least a portion of a push button 60 within the block 62 at all times.

It is obvious that the several caliper arms 25 and the several caliper arms 27 are staggered with respect to each other so that both sets of arms can be maintained in an inoperative position by the catch 70. Because the caliper arms 25 when in operation are longer than are caliper arms 27 the potentiometer 35 and its related parts are disposed in the lower portion of the body member 18 and the potentiometer 37 and its related parts with relatively short caliper arms 27 are disposed in the upper portion of the body member. Thus, on looking downward from a point above the caliper assembly 17 when three caliper arms 25 and three caliper arms 27 are used the projection of these sets of caliper arms on a horizontal plane appear such that each caliper arm is separated from the adjacent caliper arms by an angle of 60 degrees. Caliper arms 27 to which slides 29 are attached are also hooked in an inoperative position by hooks 92 disposed on arms 27. These hooks are held by hook-rods 90 in an inoperative position until such time as catch 70 is pushed upward to move hook-rods 90 upward. These hook-rods are attached to catch 70. All of the hooks 92 on caliper arms 27 and hooks 69 on caliper arms 25 are then released in one operation as the apparatus 17 reaches the bottom of the well and push button 60 actually touches the floor. When such condition exists, that is, when the assembly reaches the bottom of the well push button 60 causes catch 70 to release the caliper arms and the tension springs 72 and 96 then cause the arms to move outward with slides 29 touching the surface of the mud cake and the outer ends of arms 25 penetrating the mud cake to the actual earthy walls of the well. When the caliper arms are placed in operative position the reel 23 is then operated to slowly lift the assembly 17 up the well bore by the cable 19. This cable 19 and the caliper assembly are suspended from pulley 39 and the cable passes over a depth measuring device 21 and thence around the reel 23. Connection 51 serves to operate a recorder 49 in time with the depth measuring device 21. Disposed within cable 19 are intended to be the several wires leading from the potentiometers 35 and 37. Wires 20 lead from a take off on the reel 23 through an amplifier 45, grounded at 47, to the recorder 49. A source of electrical current 41 grounded at 43 provides current for operation of this apparatus.

Figure 5 illustrates in diagrammatic form the uphole and the down-hole electrical apparatus and wiring for use with the embodiment of my invention illustrated in Figures 1 and 2. In the down-hole portion, the potentiometers 35 and 37 correspond to the potentiometers bearing these same reference numerals in Figure 1. Caliper arms 25 and 27, the latter having the slides 29, disposed on their ends are also illustrated. Wires 32 and 26 connect, respectively, potentiometers 35 and 37 with the up-hole apparatus. Wire 52 leads to both potentiometers from the source of electric current 41. Wires 26 and 32, 32a lead to a recorder 50, grounded at 54a. Lead wires 54 supply current for operating the mechanism of the recorder 50. A pair of traces $d_2$ and $d_1$, when properly calibrated represents respectively the inner diameter and the outer diameter of the mud cake. Thus, instrument 50 indicates and records the respective diameters of the inside and of the outside of the mud cake. If desired, an instrument operating as just described is all that is required. From the traces $d_1$ and $d_2$ on instrument 50, it is merely necessary to subtract the $d_2$ value from the $d_1$ value and divide the difference by 2. However, it is considerably more convenient and less subject to error to provide another recorder 48 which is intended to record the actual mud cake thickness. With lead wire 32 and wires 26 and 26a leading from the potentiometers to a differential amplifier 46, grounded at 44, and thence to instrument 48 the actual mud cake thickness is recorded. The differential amplifier which is a standard piece of equipment permits transmitting of only the difference in the E. M. F. from two potentiometers onto the recorder 48 and thus the actual value of the E. M. F. reaching recorder 48 is the difference between the inner and outer mud cake diameters. By calibrating instrument 48 to read half the difference of the diameters in place of the entire difference in diameters this instrument then actually records the mud cake thickness.

Figure 8:
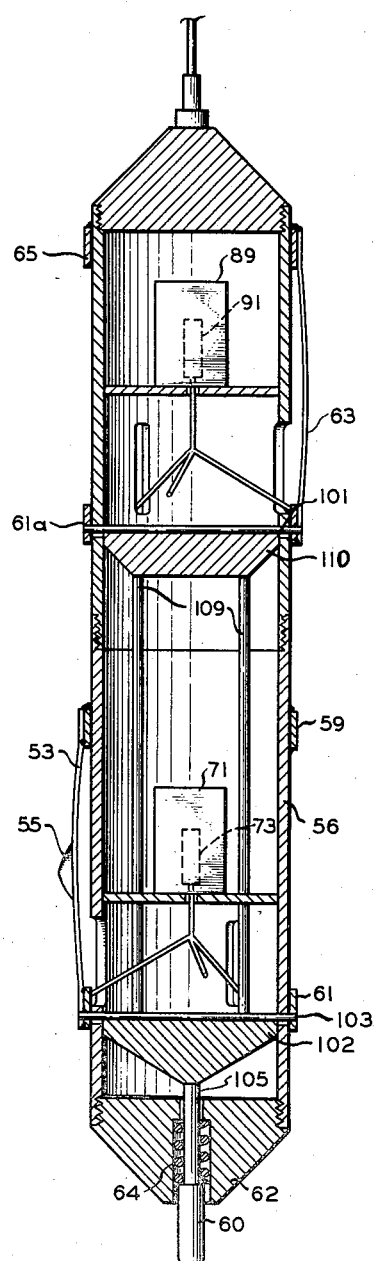
Figure 8 is an elevational view, partly in section, of the apparatus of Figure 7.

In Figures 7 and 8 are illustrated another embodiment of apparatus employing the principles of my invention. In this embodiment the caliper arms in place of being long arms hinged at one end are bow springs 53 and 63 which when released into an operative position bow outward from the housing of the instrument to contact the walls of the mud cake and of the drill hole. In this embodiment a body or housing member 56 is more or less similar to body member 18 of Figure 1 but it is slightly different. Disposed around the body member below a midpoint, is a ring or band 57 attached by welds 59 to body 56. Attached to ring or band 57 are several bow springs 53 attached at their upper ends to ring 57 also by welds 59. To about the outside center of bow springs 53 are attached cutters 55 for penetrating the mud cake on the walls of the well. The lower ends of the bow springs 53 are attached to a lower slidable ring 61. As the diameter of the walls of a well change, the ring 61 moves upward or downward. On the upper portion of body member 56 is fastened a ring 65 by welds 67. To this ring are attached bow springs 63 also by welds 67. The lower ends of these latter bow springs are attached to a slidable ring 61a. The outer center surfaces of these bow springs 63 slide along the mud cake surface as the apparatus moves in a well to indicate the inner diameter of the mud cake. The slide bands 61a and 61 are attached through openings in the body member 56 to mechanisms inside of the body member for operation of, for example, potentiometers or differential transformers. Such a differential transformer is illustrated in Figure 8 by reference numerals 71 and 89. As illustrated in the drawing the slidable band 61a is attached to a movable core 91 in the differential transformer 89 while the movable band 61 is similarly attached to a movable core 73 in the differential transformer 71. The lower assembly of bow springs with their cutter 55 move in and out, that is, toward the body member 56 and away from the body member 56 thereby causing the slidable band 61 to move up and down thereby moving the movable core 73 up and down to operate the differential transformer 71. The movements of cores 73 and 91 of these transformers regulate the amount of electrical current flowing from the transformer up the bore hole to the up-hole apparatus. In Figure 6 is illustrated an electrical diagram for the operation of such apparatus. Reference numeral 93 identifies a source of alternating current which is grounded at 94 and lead 75 goes to transformer 71 and thence to transformer 89, grounded at 81, thereby connecting the primary windings of these two transformers in series. The secondary winding of transformer 71 is grounded at 79 while the other terminal is connected by wire 76 to one terminal of a recorder apparatus 50. This apparatus 50 is exactly like the recorder apparatus 50 illustrated in Figure 5. One terminal of the secondary winding of transformer 89 is also grounded at 85 while the other terminal is connected by wire 83 to recorder 50 and by wires 83 and 87 to differential amplifier 46 similar to that illustrated in Figure 5. This differential amplifier of Figure 6 is also grounded at 44. Recorder 50 is grounded at 54a while wires 54 bring electrical current for operating the mechanism of the recorder. The two-point recorder 50 thus records the inner diameter and the outer diameter of the mud cake. As mentioned above relative to Figure 5 in order to determine the mud cake thickness it is merely necessary to take the difference of the two diameters recorded on record 50 and divide by 2. However, under many conditions it is preferable to record this difference directly and accordingly recorder 48 is provided. By providing the differential amplifier 46 and calibrating the recorder 48 for recording in terms of half the difference in diameters the mud cake thickness is observed directly from the trace made by recorder 48. To complete the circuit from transformer 71 wire 77 connects wire 76 with the differential amplifier 46.

When such an apparatus as that illustrated in Figures 7 and 8 is assembled above ground it is necessary to contract the bow springs 53 and 63 so that the apparatus can be easily lowered into the bore hole. In order to hold these bow springs in a contracted position I provide apparatus parts illustrated in Figure 8. This particular apparatus consists of a push button 60 similar to that illustrated in Figure 2. This push button slides up and down against a compression spring 64 within a plug 62. To the upper end of push button 60 is attached a push rod 105, to the upper end of which is attached a shear element 102. When assembling this apparatus the bow springs 53 are contracted and ring 61 is moved downward and a shear pin 103 is positioned through openings in opposite sides of body member 56 as shown. A similar shear pin 101 is positioned through openings in opposite sides of body member 56 in the upper slidable band 61a to hold bow springs 63 in a contracted position. To the upper portion of shear element 102 are attached rods 109 which lead to an upper shear element 110. This upper shear element is intended to shear the upper shear pin 101 at the same time shear element 102 shears pin 103. Thus when this apparatus reaches the bottom of the drill hole, push button 60 is forced into plug 62 and rod 105 pushes shear elements 102 and 110 upward thereby shearing pins 103 and 101 which operation releases the slidable bands 61 and 61a and the bow springs are released to their operable positions. After this release the apparatus is then ready to be slowly raised up the drill hole. Such an apparatus as illustrated in Figures 7 and 8 is pulled upward by a cable and connecting wires similar to those illustrated in Figure 1.

The operation of the differential transformer is fully described in U. S. Patent 2,427,866.

Figure 9:
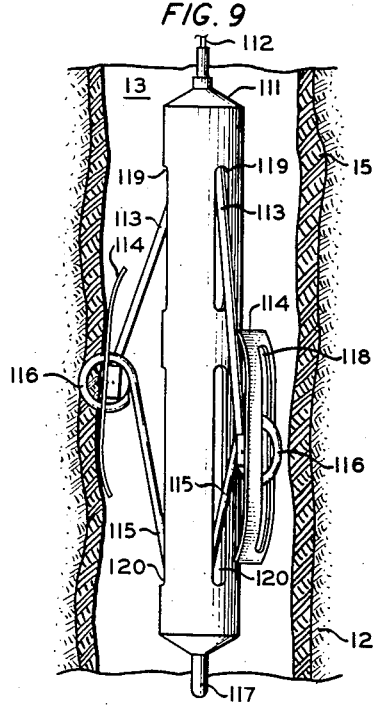
Figure 9 is an elevational view of another embodiment of my caliper assembly positioned in a well.

The embodiment of my invention illustrated in Figure 9 is, in general, similar to that of Figures 1 and 2, the main difference being that one set of calipers is inverted so that the caliper tips can measure the inner diameter and the outer diameter of the mud cake at the same point. In Figure 9, the wall of the well or bore hole is identified by reference numeral 12, the well by numeral 13 and the mud cake by numeral 15. This embodiment of apparatus includes a case or body member 111 which houses apparatus parts which are more or less similar to those illustrated in Figure 2. This case is suspended in the well by a cable 112 which includes a steel cable for support and wires for electrical connection with above ground apparatus. Caliper arms 113 extend through openings or slots 119 in the case 111. These arms 113 are pivoted in case 111 in a manner similar to arms 27 in case 18 of Figure 2, that is, to operate a potentiometer. These caliper arms 113 have on their extremities pads or slides 114 which are more or less similar to the slides or pads 29 of Figure 2. One difference exists, however, in that each pad 114 of Figure 9 is provided with a narrow slot 118 disposed vertically. In each slot is disposed a ring 116 having a sharp cutting edge for cutting through the mud cake as the apparatus is moved upward in a well. To each ring is attached a caliper arm 115. These caliper arms 115 also operate a potentiometer, not shown. Slots 120 in the case 111 are provided for arms 115.

A push button 117 extends below body 111 and is intended to cause release of the two sets of caliper arms into their respective operating positions at such a time as the button is forced into the case 111 when this apparatus reaches the bottom of the well. A mechanism more or less similar to that illustrated in Figure 2 transmits movement from push button 117 to some hooks or similar elements on the caliper arms, not shown. These hooks or other elements are also similar to those illustrated in Figure 2.

Figure 10:
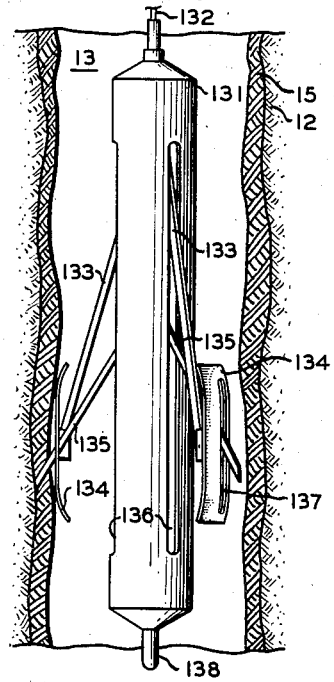
Figure 10 is an elevational view of still another embodiment of my caliper assembly positioned in a well.

In Figure 10 is illustrated another embodiment of my two-caliper apparatus which is also more or less similar to that illustrated in Figure 2. In Figure 10, a body or case 131 is shown suspended in well 13 by cable 132. On the walls 12 of the well is disposed mud cake 15 the thickness of which is to be measured. In the case 131 are disposed two potentiometers, not shown, but similar to those illustrated in Figure 2. In the embodiment of Figure 10, the potentiometers are disposed near one another in the case so that caliper arms 133 and 135 touch and cut through the mud cake at substantially the same point. Arms 133 have attached to their extremities pads or slides 134, similar to those illustrated in Figure 9. Each slide 134 contains an elongated slot 137 through which an arm 135 extends. The ends of arms 135 are sharpened like knife blades so that the arms are able to cut through the mud cake as the apparatus is moved upward in the well. Slots 136 in the wall of the body member are for accommodation of the caliper arms, one arm 133 and one arm 135 extending through each slot 136. This embodiment is provided with a push button 138 which operates in conjunction with mechanism within the case and not shown, to release the caliper arms to an operative position whenever the apparatus touches the bottom of the well. Cable 132 includes steel cable for carrying the weight of the apparatus and also wires for transmission of electrical impulses.

In each of the embodiments of Figures 9 and 10 there are three caliper arms in conjunction with each potentiometer, i. e., there are three arms 113, three arms 115 (Figure 9), three arms 133 and three arms 135 (Figure 10).

Figure 11:
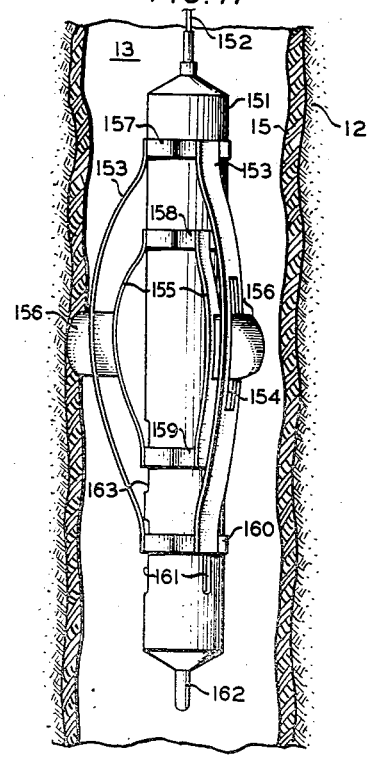
Figure 11 is an elevational view of yet another embodiment of my caliper assembly positioned in a well.
Figure 12:
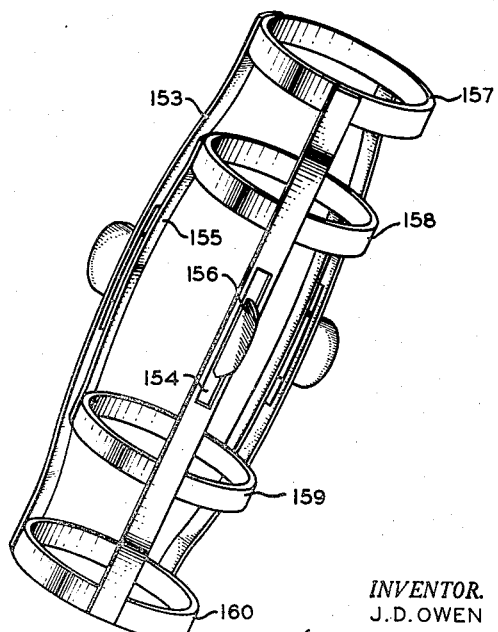
Figure 12 is a front elevational view of a portion of Figure 11.

In the embodiment of my apparatus illustrated in Figures 11 and 12, a case or body member 151 is suspended by a cable 152 in well 13 on the walls 12 of which is disposed mud cake 15. This embodiment of apparatus is somewhat similar to that illustrated in Figures 7 and 8, that is, the caliper arms are bow springs. In Figures 11 and 12 the bow springs are so arranged that the outside and inside diameters of the mud cake are taken at substantially the same points. Bow springs 153 are attached to a ring 157 which in turn is attached to a body member 151. Each of these springs is provided with a slot 154 at the point of contact of the spring with the mud cake. These bow springs 153 are sufficiently wide to serve as slides on the mud cake upon moving the body member upward in the drill hole. The other ends of these long springs are attached to a ring 160 which is slidable with respect to case 151. Short bow springs 155 are attached at their upper ends to a ring 158 which is attached to case 151. On the outer surface of each short bow spring 155 is positioned a cutter or knife edge 156 as shown. These cutters are so sharpened that they cut through the mud cake as the apparatus is lifted up the well. The lower ends of the short springs 155 are attached to a slidable ring 159. These slidable rings 159 and 160 are attached through slots 163 and 161, respectively, to potentiometers or to differential transformers in the case 151 as illustrated in Figures 7 and 8. Push button 162 causes shearing of pins to release rings 159 and 160 in a manner similar to that illustrated in Figure 8 when the case 151 is bottomed in the drill hole. Cable 152 is intended to include a cable for support purposes and wires for completing electrical circuits between this apparatus and apparatus above ground.

Figure 12 is a front view of a corresponding pair of bow springs, that is, one long bow spring 153 and a short bow spring 155 with cutter 156 attached to the short bow spring and extending through slot 154 in the long spring.

The same above ground electrical and mechanical apparatus is used in conjunction with the embodiment of Figures 9, 10, and 11 as are illustrated in Figures 1, 5 and 6. The electrical apparatus of Figure 5 is used with the embodiments of Figures 9 and 10 when these employ potentiometers and the electrical apparatus of Figure 6 is used with the embodiment of Figure 11 when differential transformers (see Figure 8) are used.

Each of the embodiments of Figures 9, 10 and 11 is used in conjunction with a depth measuring device as hereinbefore disclosed.

Various alterations of apparatus parts can be made as desired, for example, under some conditions only two bow springs 53 and two bow springs 63 are used while under other conditions four bow springs 63 and four bow springs 53 are used. However, it is preferable to employ three bow springs 53 and three bow springs 63. Similarly, two bow springs 153 and two springs 155 (of Figure 11) or four of each can be used, but I prefer to employ three of each set of bow springs for best operation. I find that use of three of each of these bow springs gives dependable determinations in recording mud cake diameter and thickness. The one and two point recorders and the differential amplifier as illustrated in Figures 5 and 6 are standard equipment and can be obtained from instrument supply houses.

While certain embodiments of this invention have been described for illustrative purposes the invention obviously is not limited thereto.

What is claimed is:

1. Apparatus for measuring the thickness of a mud cake on the wall of a drill hole comprising, in combination, a body member adapted to be lowered into a drill hole, first caliper arms, one end of each first arm being supported by said body member, a separate pad on another portion of each arm, the pads being adapted to slide on the surface of said mud cake, second caliper arms, one end of each second arm being supported by said body member, another portion of each second arm being adapted to cut through said mud cake, a first biasing means, said first biasing means being adapted to bias said pads against the surface of said mud cake, a second biasing means, said second biasing means being adapted to bias said another portion of each second arm to cut through said mud cake, and third means to hold said first arms and pads and said second arms inoperative against said first and said second biasing means, respectively, said third means being a push button assembly mounted in said body member and extending below said body member, said push button assembly being adapted to release said first arms and pads and said second arms to operative positions upon movement of a push button of said push button assembly into said body member, and means to indicate the difference in positions of said pads relative to said other portions of said second arms.

2. Apparatus for measuring the thickness of a mud cake on the wall of a drill hole comprising, in combination, a body member adapted to be lowered into a drill hole, first caliper arms, one end of each first arm being supported by said body member, a separate pad on the other end of each arm, the pads being adapted to slide on the surface of said mud cake, second caliper arms, one end of each second arm being supported by said body member, the other end of each second arm being adapted to cut through said mud cake, a first biasing means, said first biasing means being adapted to bias said pads against the surface of said mud cake, a second biasing means, said second biasing means being adapted to bias said other end of each second arm to cut through said mud cake, and third means to hold said first arms and pads and said second arms inoperative against said first and said second biasing means, respectively, said third means being a push button assembly mounted in said body member and extending below said body member, said push button assembly being adapted to release said first arms and pads and said second arms to operative positions upon movement of a push button of said push button assembly into said body member, means to indicate the difference in positions of said other ends of said first arms relative to said other ends of said second arms.

3. Apparatus for measuring the thickness of a mud cake on the wall of a drill hole comprising, in combination, a body member adapted to be lowered down a drill hole, first caliper arms comprising at least a pair of first arms supported by said body member, a separate pad on one portion of each arm, the pads being adapted to slide on the surface of said mud cake upon upward movement of said body member in said drill hole, second caliper arms comprising at least a pair of second arms supported by said body member, one portion of each second arm being adapted to cut through said mud cake upon upward movement of said body member in said drill hole, a first biasing means, said first biasing means being adapted to bias said pads against the surface of said mud cake, a second biasing means, said second biasing means being adapted to bias said one portion of each second arm to cut through said mud cake, and third means to hold said first arms and pads and said second arms inoperative against said first and said second biasing means, respectively, said third means being a push button assembly mounted in said body member and extending below said body member, said push button assembly being adapted to release said first arms and pads and said second arms to operative positions upon movement of a push button of said push button assembly into said body member, means to indicate the mud cake thickness in response to the difference in diametric positions of said pads of said first arms and said one portion of said second arms.

4. The apparatus of claim 3 wherein said first caliper arms comprise three arms and said second caliper arms comprise three arms.

5. The apparatus of claim 1 wherein said first caliper arms are linear arms having a hinged flat pad on the end of each arm opposite said body member, the flat pads being adapted to slide on the surface of said mud cake, said second caliper arms being linear arms having their ends opposite said body member suitably thinned and adapted to cut through said mud cake to the walls of said drill hole upon upward movement of said body member in said drill hole.

6. The apparatus of claim 1 wherein said first caliper arms are first bow springs along the exterior of said body member, said first bow springs being sufficiently wide to serve as slide pads on said mud cake upon moving said body member upward in said drill hole, and said second caliper arms are second bow springs having a cutter mounted on the surface of each second bow spring facing said mud cake, the cutters being adapted to cut through said mud cake upon moving said body member upward in said drill hole.

7. Apparatus for measuring the thickness of a mud cake on the wall of a drill hole comprising, in combination, a body member adapted to be lowered into a drill hole, first caliper arms, one end of each first arm being supported by said body member, first means biasing another portion of each first arm against the surface of said mud cake, second caliper arms, one end of each second arm being supported by said body member, second means biasing another portion of each second arm to cut through said mud cake upon upward movement of said body member in said drill hole, third means to hold said another portion of each first arm and said another portion of each second arm inoperative against said first means and said second means respectively, said third means being a push button assembly mounted in said body member and extending below said body member, said push button assembly being adapted to release said another portion of each first arm and said another portion of each second arm to operative positions upon movement of a push button of said push button assembly into said body member, and means to indicate the difference in positions of said another portion of said first arms relative to said another portion of said second arms in terms of mud cake thickness.

8. In the apparatus of claim 3, means to indicate the distance between pads on said one portion of said first arms as a measure of the inner diameter of the mud cake, and means to indicate the distance between the cutting portions of said second arms as a measure of the outer diameter of said mud cake.

9. Apparatus for measuring the thickness of a mud cake on the wall of a drill hole comprising, in combination, a body member adapted to be lowered into a drill hole, first caliper arms, one end of each of said arms being pivotably mounted on said body member in such a manner that the other ends of said arms are movable away from the axis of said body member, a slide disposed on said other end of each of said arms, said slides being adapted to slide on the surface of said mud cake, second caliper arms comprising at least a second pair of arms, one end of each of said second pair of arms being pivotably mounted on said body member in such a manner that the other ends of said arms are movable away from the axis of said body member, said other ends of said second arms being adapted to cut through said mud cake, first means biasing the slides of said first arms in contact with said mud cake, second means biasing said other ends of said second arms into mud cake cutting contact with said mud cake, third means for retaining said first and second arms out of contact with said mud cake against their bias and for releasing said first and second arms, said third means comprising a push button assembly having one portion extending downward from within and below said body member and another portion extending upward therefrom within said body member, the upward extending portion including a catch adapted to retain said other end of at least one of the second arms against said second biasing means, and a hook adapted to retain said other end of at least one of said first arms against said first biasing means, said catch and said hook being adapted to release said other ends of said first arms and said other ends of said second arms upon movement of said one portion of said push button assembly toward and into said body member, and means to indicate the relative difference in positions of said other ends of said first arms against said mud cake and of said second arms cutting said mud cake as a measure of the mud cake thickness.

10. In the apparatus of claim 9, means to indicate the distance between the slide portions of said first arms as a measure of the inner diameter of the mud cake, and means to indicate the distance between the cutting portions of said second arms as a measure of the outer diameter of said mud cake.

11. Apparatus for measuring the thickness of a mud cake on the wall of a drill hole comprising in combination, a body member adapted to be lowered into a drill hole, first caliper arms, one end of each first arm being supported by said body member, another portion of each arm being slotted and adapted to slide on said mud cake, second caliper arms, one end of each second arm being supported by said body member, another portion of each second arm being adapted to extend through the slotted portion of a corresponding first arm and to cut through said mud cake, and means to indicate the difference in positions of said another portion of said first arms relative to said another portion of said second arms as a measure of the thickness of the mud cake.

12. The apparatus of claim 11 wherein said another portion of each second arm extending through said slotted portion of a corresponding first arm is a knife blade, said knife blade being adapted to cut through said mud cake upon raising the apparatus upward in a well coated with a mud cake.

13. The apparatus of claim 11 wherein said another portion of each second arm extending through said slotted portion of a corresponding first arm is a ring, said ring having at least a portion of its periphery sharpened to form a cutting edge to cut through said mud cake upon raising the apparatus upward in a well coated with a mud cake.

14. The apparatus of claim 11 wherein said first caliper arms are first bow springs, said second caliper arms are second bow springs, and wherein said another portion of each second arm extending through the slotted portion of a corresponding first arm is a knife edge, said knife edge being adapted to cut through said mud cake upon raising the apparatus upward in a well coated with a mud cake.

15. The apparatus of claim 11 wherein said another portion of each second arm extending through said slotted portion of a corresponding first arm is a circular member, said circular member having at least a portion of its periphery sharpened to form a cutting edge to cut through said mud cake upon raising the apparatus upward in a well coated with a mud cake.

16. Apparatus for measuring the thickness of a mud cake on the wall of a drill hole comprising in combination, a body member adapted to be lowered into a drill hole, first caliper arms, one end of each first arm being supported by said body member, another portion of each arm being slotted and adapted to slide on said mud cake, second caliper arms, one end of each second arm being supported by said body member, another portion of each second arm being adapted to extend through the slotted portion of a corresponding first arm and to cut through said mud cake, and means to indicate the positions of said another portion of said first arms and of said another portion of said second arms as a measure of the inner diameter of the mud cake and of the diameter of the drill hole, respectively.

17. Apparatus for measuring the thickness of a mud cake on the wall of a drill hole comprising in combination, a body member adapted to be lowered into a drill hole, first caliper arms, one end of each first arm being supported by said body member, another portion of each arm being slotted and adapted to slide on said mud cake, second caliper arms, one end of each second arm being supported by said body member, another portion of each second arm being adapted to extend through the slotted portion of a corresponding first arm and to cut through said mud cake, means to indicate the positions of said another portion of said first arms and of said another portion of said second arms as a measure of the inner diameter of the mud cake and of the diameter of the drill hole, respectively, and means to indicate the difference in positions of said another portion of said first arms relative to said another portion of said second arms as a measure of the thickness of the mud cake.

References Cited in the file of this patent

UNITED STATES PATENTS

| | | |
|---|---|---|
| 2,398,562 | Russell | Apr. 16, 1946 |
| 2,497,990 | Huber et al. | Feb. 21, 1950 |
| 2,588,717 | Goodwin | Mar. 11, 1952 |
| 2,636,383 | More et al. | Apr. 28, 1953 |
| 2,639,512 | Legrand | May 26, 1953 |